United States Patent
Chasseguet et al.

(10) Patent No.: US 6,296,445 B1
(45) Date of Patent: Oct. 2, 2001

(54) BLADE WHEEL

(75) Inventors: Gustave Chasseguet, Taverny; Frédéric Sauvage, Antony, both of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/424,407

(22) PCT Filed: Mar. 29, 1999

(86) PCT No.: PCT/FR99/00718

§ 371 Date: Apr. 6, 2000

§ 102(e) Date: Apr. 6, 2000

(87) PCT Pub. No.: WO99/50573

PCT Pub. Date: Oct. 7, 1999

(30) Foreign Application Priority Data

Mar. 31, 1998 (FR) .................................................. 98 04216

(51) Int. Cl.$^7$ ........................................................ F04D 29/38
(52) U.S. Cl. .......................... 416/180; 416/197; 416/213 R
(58) Field of Search ................................ 416/180, 179, 416/197, 213 R, 241 A, 182

(56) References Cited

U.S. PATENT DOCUMENTS

| | | |
|---|---|---|
| 2,855,852 | 10/1958 | Gamble . |
| 3,156,970 | 11/1964 | Zojac . |
| 5,109,604 * | 5/1992 | Koebele ........................... 29/889.5 |
| 5,720,595 | 2/1998 | Avny . |

FOREIGN PATENT DOCUMENTS

| | | |
|---|---|---|
| 2346356A1 | 3/1975 | (DE) . |
| 4336386A1 | 4/1995 | (DE) . |
| 802837 | 10/1958 | (GB) . |
| 7-4496 | 1/1995 | (JP) . |

OTHER PUBLICATIONS

Patent Abstract of Japan vol. 95, No. 004 May 31 1995.

* cited by examiner

*Primary Examiner*—Edward K. Look
*Assistant Examiner*—James M McAleenan
(74) *Attorney, Agent, or Firm*—Liniak, Berenato, Longacre & White

(57) ABSTRACT

A blade wheel (10) for a motor vehicle hydrokinetic transmission apparatus having globally a half-torus shape, and comprising axially and successively arranged, a continuous front shell (12) globally shaped like a half-torus with large external diameter, and a continuous rear shell (16), coaxial with the front shell (12), globally shaped like a half-torus with a small external diameter, between which is arranged as assembly of blades (14) whereof the blades (26) extend radially, circumferentially and axially between a concave wall (20) of the front shell (12) and an opposite convex wall (40) of the rear shell (16), the assembly of blades (14), and the front shell (12) are separately made, then assembled to constitute a blade wheel (10), the blade wheel (10) blades (26) being mutually connected at least partly, for example with rings (28, 30), and produced by molding.

15 Claims, 5 Drawing Sheets

BLADE WHEEL

BACKGROUND OF THE INVENTION

1. Field of the Invention

This invention relates to a bladed turbine or impulse wheel for a torque converter of a hydraulic apparatus.

More particularly, the invention relates to a bladed turbine or impulse wheel for a hydraulic torque transmission apparatus for a motor vehicle, of the type which has, substantially, the general form of a half torus, and of the type which comprises, arranged axially and successively in this order, an endless front shell which has the general form of a half torus of large outer diameter, and an endless rear shell coaxial with the front shell and having the general form of a half torus of small outer diameter, between which there is arranged a set of blades, the blades of which extend radially, circumferentially and axially between a concave wall of the front shell and a convex wall of the rear shell in facing relationship therewith.

2. Description of Related Art

There are numerous known examples of bladed wheels which are employed in hydraulic torque converters of the type described above.

In such a converter the bladed wheels constitute either a turbine, that is to say a driven rotor, or an impulse wheel, that is to say a driving rotor, and generally they consist of a circular set of blades which are spaced apart circumferentially at regular angular intervals, a front shell to which the convex edges of these blades are joined, and a rear shell to which the concave edges of the said blades are joined.

The blades are generally formed in a method of fabrication by stamping, and they include spigots for fastening by seaming to the front shell and to the rear shell, which include fastening notches in which the fastening spigots of the blades are introduced before being upset.

The document U.S. Pat. No. 5,109,604 describes such an arrangement.

In that document the convex edges of the blades define a single fastening spigot which extends over the whole length of the blades, while the concave edges of the blades include a single fastening spigot, the fastening spigots of the convex and concave edges of the blades being adapted to be received in the notches of the front shell and rear shell respectively.

It can easily be perceived that such a method of fastening only has a reduced amount of rigidity, which can prove particularly prejudicial to good integrity of the bladed wheel when the fluid pressure between the blades increases. In this connection, an increase in the pressure of the fluid is also accompanied by an increase in vibrations, and in practice, an insufficiently rigid blades mounting increases the deformation of the blades and the danger of disintegration of the elements of the bladed wheel.

In addition, it is known that there prevails in the casing of a motor vehicle hydraulic converter a pressure of 2 to 10 kg/cm$^2$ while it is working. It is also known that the adoption of a high working pressure enables the influence of cavitation effects to be reduced on the blades of the converter, and that these effects impose a large penalty on the performance of the converter.

However, a conventional arrangement of blades, because it is not rigid enough, does not enable the working pressure of the converter to be increased without running the risk of disintegration of the converter.

Up to the present time, the methods which have to be used for stamping the blades because of the need to give the blades a curved form which is essential in order to establish a plurality of velocity gradients in the fluid in a radial direction of the bladed wheel, have made it necessary to form each blade as a separate piece. This configuration makes it impossible to avoid the use of spigots and notches to assemble the blades in the shells in the manner described above.

Recent improvements in molding methods, particularly as regards the manufacture of components in aluminum alloy or thermoplastic or thermosetting plastics material reinforced with fibers of glass, carbon or Kevlar, now enable complex forms to be made by casting or injection molding with easier stripping from the mould, and in particular they enable components which include a plurality of blades with awkward and complex profiles to be made.

SUMMARY OF THE INVENTION

In order to overcome the drawbacks linked to the lack of rigidity in conventional arrangements, while giving good fluid flow between the blades of the turbine and impulse wheels, the invention proposes to provide a bladed wheel which makes use of the improvements described above.

With this in view, the invention proposes a bladed wheel of the type described above, characterized in that the rear shell, the set of blades, and the front shell, are formed separately and are then assembled together so as to constitute the bladed wheel, the blades of the bladed wheel being joined at least partly together and being made by molding.

Thanks to the invention, the blades may have the curved form which is required for good fluid flow, while being made in a simple manner by molding in the form of one or more sub-assemblies.

These steel elements may form the above mentioned spigots.

According to further features of the invention:

- the set of blades is bounded axially by a rear envelope surface which is party complementary to the convex wall of the rear shell, and by a front envelope surface which is complementary with the concave wall of the front shell;
- in order to facilitate stripping from the mould, the blades are joined together by means of a small annular ring portion which is in cooperation with an annular inner centering edge of the front shell, and a large annular ring portion which is in cooperation with an annular external centering edge of the front shell;
- the rear shell, the set of blades, and the front shell are assembled together by adhesive bonding;
- the annular outer edge of the front shell is adhesively bonded on the large annular ring portion connecting the blades together, and the annular inner edge of the front shell is adhesively bonded on the small annular ring portion connecting the blades together;
- the convex wall of the rear shell is bonded adhesively on concave rear edges of the blades, and the concave wall of the front shell is adhesively bonded on convex front edges of the blades;
- the convex wall of the rear shell includes adhesive bonding lugs which extend axially forward along the side faces of blades in the blade set, and on which the blades are bonded adhesively;
- the concave wall of the front shell includes adhesive bonding lugs which extend axially rearward along side faces of blades and on which the blades are adhesively bonded;

the concave wall of the front shell includes notches adapted to receive spigots which extend axially forward from convex edges of the blades;

the convex wall of the rear shell includes notches adapted to receive spigots which extend axially rearwards from concave edges of the blades;

each of the small annular ring portion and large annular ring portion includes on its periphery notches which are adapted to receive spigots that extend axially rearwards, respectively from the annular inner centering edge of the front shell and from the annular outer centering edge of the front shell;

the set of blades consists of a plurality of angular portions;

the set of blades is cast in aluminum alloy;

the set of blades is molded in a thermoplastic or thermosetting plastics material reinforced with fibers of glass, carbon or Kevlar.

In the case of a thermoplastic plastics material, the set of blades can be assembled to the shells by friction welding.

The assembly, or the sub-assemblies, of the blades may include overmolded steel elements for fastening the blades by welding to the front and rear shells, which are accordingly made of metal.

These steel elements may define the above mentioned spigots.

BRIEF DESCRIPTION OF THE DRAWINGS

Further features and advantages of the invention will appear on a reading of the following detailed description, for an understanding of which, reference is made to the attached drawings, in which.

DETAILED DESCRIPTION OF PREFERRED EMBODIMENT

In the description, identical reference signs designate identical or similar sub-assemblies.

The terms front, rear, axial and radial have the meaning, throughout the description, given to the similar terms where described with reference to FIG. 1.

Figure 1:
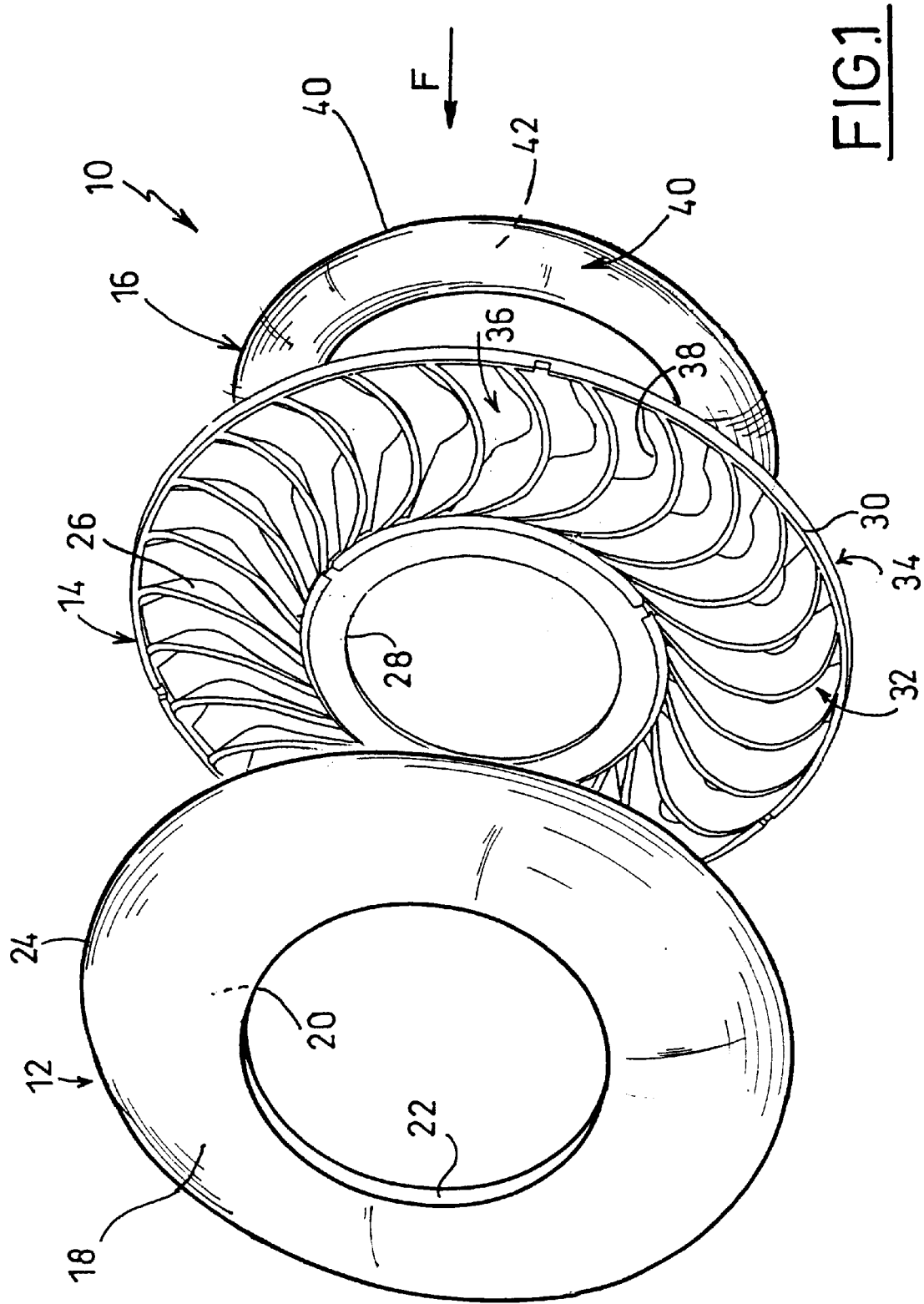
FIG. 1 is an exploded perspective view showing the three main components of the bladed wheel in a first embodiment of the invention.

FIG. 1 shows the assembly of three elements 12, 14, 16 which constitute a bladed wheel 10 made in accordance with the invention.

Such a bladed wheel 10 is designed to be a component part of a torque converter which is mounted within a hydraulic coupling filled with fluid (not shown), which is interposed for example between the engine and transmission of a vehicle. The wheel 10 may be either a turbine wheel or an impulse wheel of the converter.

The bladed wheel 10 comprises a front shell 12, a set of blades 14, and a rear shell 16.

The front shell 16 is substantially in the form of a hollow half torus of large diameter, and includes a convex front wall 18 and a concave rear wall 20. The front shell 12 is bounded radially, firstly by an annular inner edge 22 of small diameter, and secondly by an annular outer edge 24 of large diameter.

Preferably, the front shell 12 can be made by casting in an aluminum alloy, or by molding in a thermoplastic or thermosetting plastics material, or again it may be formed by plastic deformation of a metallic material such as sheet steel.

The set of blades 14, which carries the blades 26 of the bladed wheel 10, is adhesively bonded on the concave rear wall 20 of the front shell 12.

In the embodiment shown with reference to FIG. 1, the set of blades 14 is molded in one piece which is bounded by two envelopes, namely a front envelope 32 and a rear envelope 34, which define an envelope having an overall form which is substantially that of a half torus, complementary to a portion of the front shell 12. The blades 26 extend both radially and axially from a small radially inner annular ring portion 28, the inner diameter of which is the inner diameter of the set of blades 14, to a large radially outer annular ring portion 30, the outer diameter of which is the outer diameter of the set of blades 14.

In this configuration, each blade 26 is held at its inner and outer ends by the small ring portion 28 and the large ring portion 30, respectively.

Preferably, the set of blades 14 is one component which is also the product of a molding operation in an aluminum alloy or a thermoplastic or thermosetting plastics material, reinforced with fibers of glass, carbon or Kevlar.

Such a material enables moulds to be used which have low stripping angles, with these moulds making it possible to form the blade assembly 14 in one integral piece.

The ring portions 28, 30 facilitate stripping from the mould.

In another version (not shown), the set of blades 14 may consist of a plurality of groups of blades defining angular sectors, these blades being mounted on the small ring portion 28 and the large ring portion 30 respectively, and being assembled together by adhesive bonding for example.

The set of blades 14 may also, in another version, include adjacent angular portions each of which consists of blades together with parts of the two ring portions 28 and 30.

The outer diameter of the large ring portion 30 is substantially equal to the diameter of the annular outer edge 24 of the front shell 12, so that axial and radial surfaces of the large ring portion 30 are able to cooperate with complementary surfaces of the annular outer edge 24 of the front shell 12, so as to enable the set of blades 14 to be centered and fixed adhesively on the front shell 12.

More precisely, the outer periphery of the ring portion 30 cooperates intimately with the inner periphery of a portion of the edge 24.

The concave rear envelope 34 of the blades 26 receives, in an intermediate diameter corresponding to a notch 38 of the blades 26, the rear shell 16, which is assembled to the blades 26 by adhesive bonding.

A convex front wall 40 of the rear shell 16 is, in an axial plane of the wheel 10, of the same curvature as the notch 38 in the blades 26, so that the convex front wall 40 of the rear shell 16 exactly matches the blades 26 in the notches 38 of the set of blades 14.

The advantage is therefore obtained that the rear shell 16 is assembled by adhesive bonding on all of the blades 26 in the set of blades 14.

The rear shell 16 also has a concave wall 42 which is adapted to guide the hydraulic fluid in the converter so as to act on a stator (not shown) of the converter.

Figure 2:
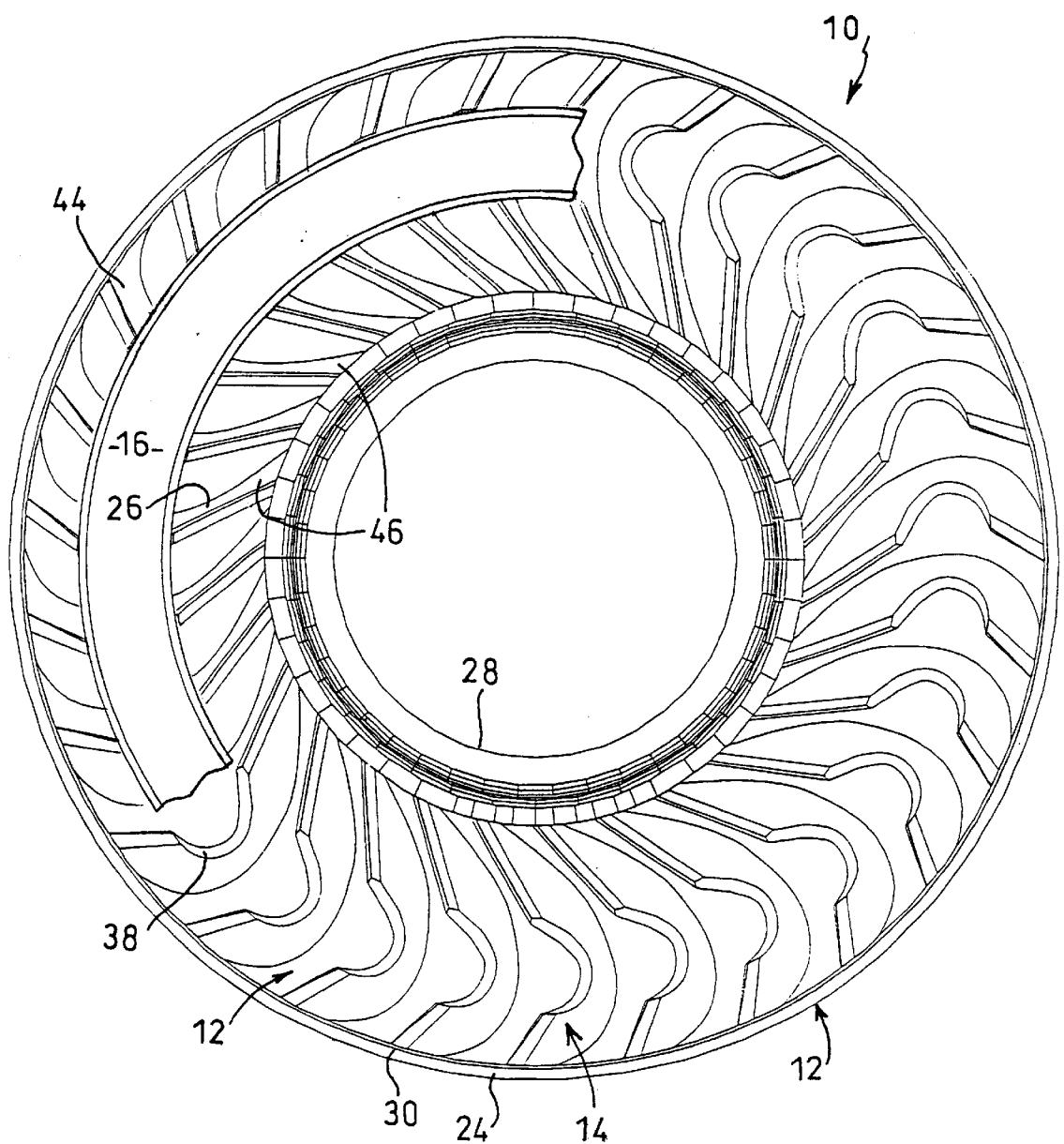
FIG. 2 is a view in the direction of the arrow F in FIG. 1, showing a bladed wheel in the assembled state.

FIG. 2 shows the bladed wheel 10 seen from the front, in the direction of the arrow F, and in its assembled state. The annular outer edge 24 of the front shell 12, which will be noted, cooperates with the annular outer edge, constituted by the ring 30, of the set of blades 14, while the rear shell 16, which will also be noted, is received in the notches 38 of the blades 26. In this configuration the bladed wheel 10 reveals, on the blades 26, the inlet profiles 44 for the hydraulic fluid and the outlet profiles 46 for the said hydraulic fluid.

In this connection, the flow of hydraulic fluid in the converter follows a particular path. In the case in which, for example, the bladed wheel 10 shown is a bladed wheel for the turbine of the hydraulic converter, the portions of the blades 26 that define the inlet profile, which are situated towards the outside of the blades 26, receive the hydraulic fluid and pass it between two consecutive blades 26 towards the outlet profile which is situated towards the inner end of the blades 26, directing it towards a stator (not shown) of the converter.

In addition, each blade 26 is in this connection curved in such a way that the inlet profile has a slope which is substantially opposed to the outlet profile.

As is known, the energy transmitted to the fluid by the impulse wheel is transmitted to the blades 26 of the turbine wheel, which cause the fluid to be directed towards the outlet profiles 46.

In this way the hydraulic fluid passes, in an axial plane of the bladed wheel 10, between a blade 26 of the turbine and a blade 26 of the impulse wheel, in a circular path which multiplies the force of the hydraulic fluid on the set of blades 14 of the bladed wheel 10 of the converter, and increases the torque exerted on the bladed wheel 10 of the turbine of the converter.

Figure 3:
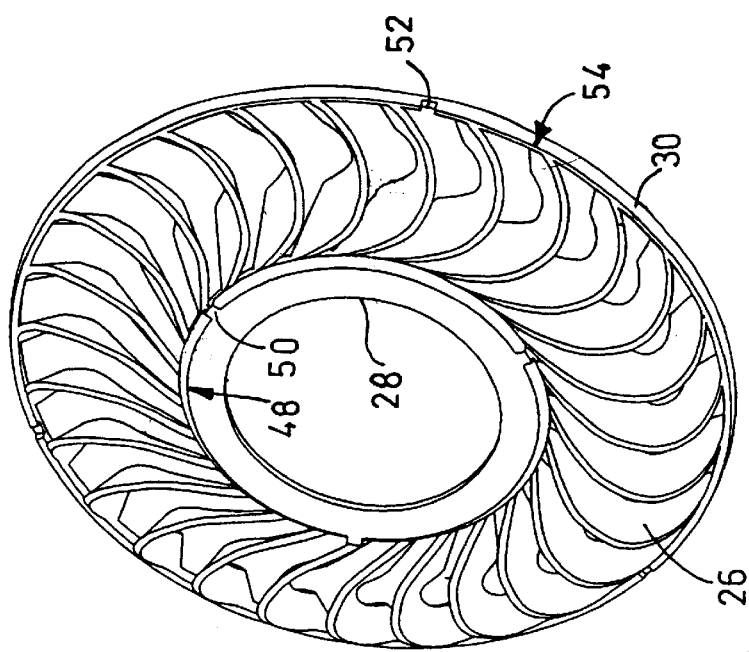
FIG. 3 is a perspective view of a second embodiment of the set of blades, having notches at its inner and outer peripheries.

FIG. 3 shows a second embodiment of the set of blades 14, which features an improvement as compared with the fastening of the blade assembly on the front shell 12. The small ring portion 28 in this example includes a collar portion 48 which extends axially towards the front shell 12, and which includes three notches 50 which are spaced apart angularly by 120° from each other. The front shell 12 includes on its annular inner edge 22 a complementary collar portion (not shown), which has three spigots arranged at intervals of 120° (not shown) and cooperating with the notches 50 of the collar portion 28 of the set of blades 14. The number of these notches is not limiting, but it is at least equal to two, so as to guarantee that relative rotation would be prevented between the front shell 12 and the set of blades 14.

This coupling is completed by three notches 52 which are disposed on a collar portion 54 of the annular front edge portion 30 of the set of blades 14. In a similar way to that described above, these notches 52 receive three complementary spigots carried by the annular outer edge 24 of the front shell 12.

In another version, the notches 50, 52 are not spaced apart circumferentially at regular intervals. The same is true for the spigots. The notches 50, 52 and the spigots provide rotational couplings by mating cooperation.

Preferably, the notches 50 and the notches 52 of the set of blades 14 are not aligned radially in such a way as to distribute the coupling stresses between the set of blades 14 and the front shell 12 when the hydraulic fluid is exerting a torque on the blades 26 of the set of blades 14.

Figure 4:
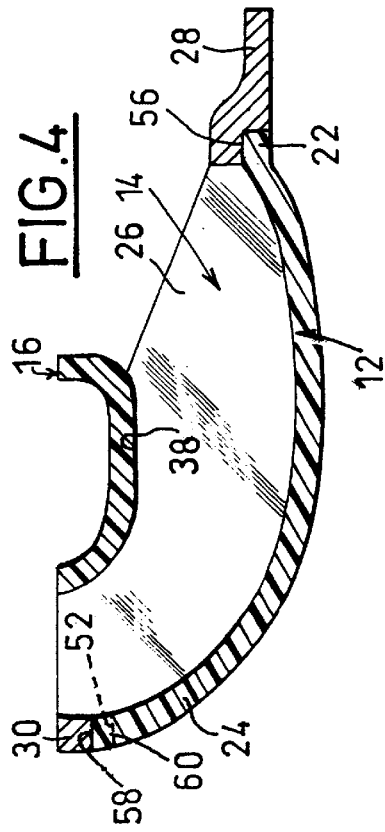
FIG. 4 is a view in cross section, taken through an axial plane, of a bladed half wheel which includes the set of blades shown in FIG. 3.

The sectional view in FIG. 4 illustrates the assembly of the set of blades 14 axially between the front shell 12 and the rear shell 18, in a plane of cross section passing through a spigot 60 in accordance with the second embodiment of the invention.

As was described above with reference to FIG. 1, the set of blades 14, includes a small ring portion 28, having an annular shoulder surface 56 which is in cooperation with the annular inner edge 22 of the front shell 12. Similarly, the larger ring portion 30 of the set of blades 14 has an annular shoulder surface 58 which is in cooperation with the annular outer edge 24 of the front shell 12.

In this case the outline of the notch 52, which receives a spigot 60 of the front shell 12, is indicated in broken lines. As to the rear shell 16, this is bonded adhesively, directly into the notch 38 in the blades 26 of the set of blades 14.

Figure 5:
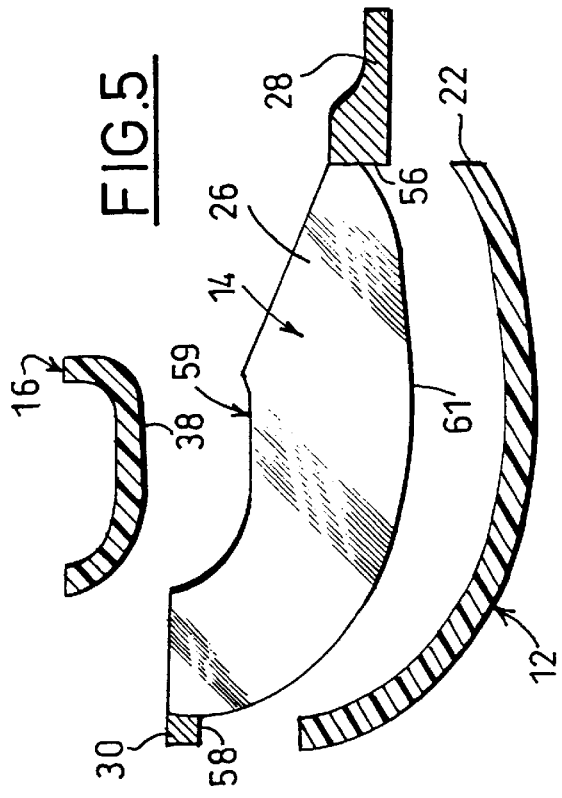
FIG. 5 is a view similar to FIG. 4, of a bladed half wheel without any axial projections, without any notches, and without any abutment lugs, that is to say one in accordance with the first embodiment shown in FIG. 2.

FIG. 5 shows the first embodiment in a modified version in which the set of blades 14 does not have notches of the type described above, and is simply bonded adhesively on the front shell 12 by means of convex edges 61 of the blades 26, and on the rear shell 16 by means of concave edges 59 of the blades 26. In this configuration, the joint between the set of blades 14 and the front shell 12 is simply obtained by adhesively bonding the shoulder surface 56 of the small ring portion 28 of the blade set 14, and bonding the shoulder surface 58 of the large ring portion 30 of the blade set 14 on the front shell 12.

Figure 6:
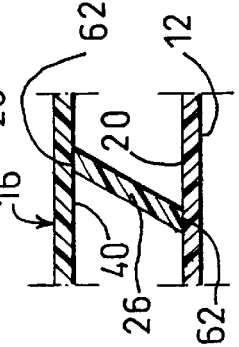
FIG. 6 is a view in cross section taken through a transverse plane passing through an intermediate portion of the blades, showing the first embodiment of the bladed wheel in accordance with FIG. 2.

The sectioned view of a blade 26 which is shown in FIG. 6, in the first embodiment, illustrates the engagement of edges 62 of the blades 26, on the one hand, on the convex annular wall 40 of the rear shell 16, and secondly on the concave annular wall 20 of the front shell 12.

FIGS. 7 to 10 show various different ways of assembling together the set of blades 14 between the front shell 12 and the rear shell 16.

Figure 7:
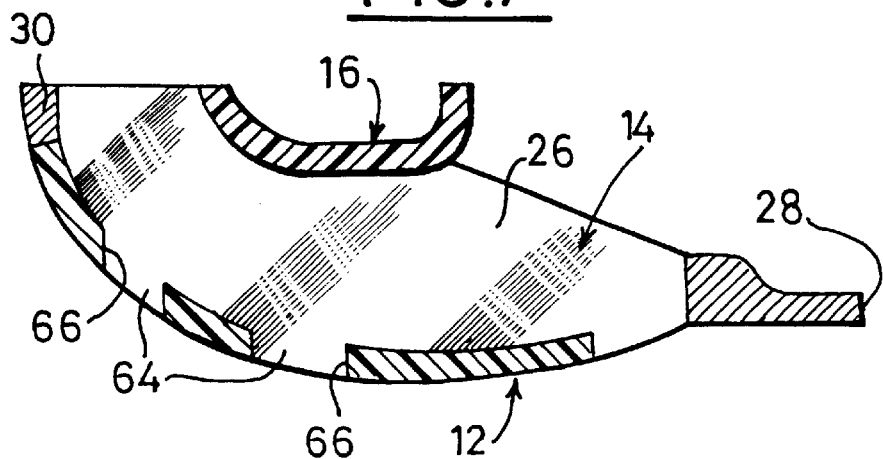
FIG. 7 is a view similar to FIG. 5, showing a third embodiment which includes blades that are provided with axial projections.

As can be seen in FIG. 7, in a third embodiment, the blades 26 include axial projections 64 which extend axially towards the front shell 12, and in which they are received through slots 66, so that the set of blades 14 is immobilized circumferentially in the front shell 12 at various points which are spaced radially away from the smaller ring 28. This third embodiment can be used in combination with the notches 50 and 52 of the second embodiment described with reference to FIG. 3.

Figure 8:
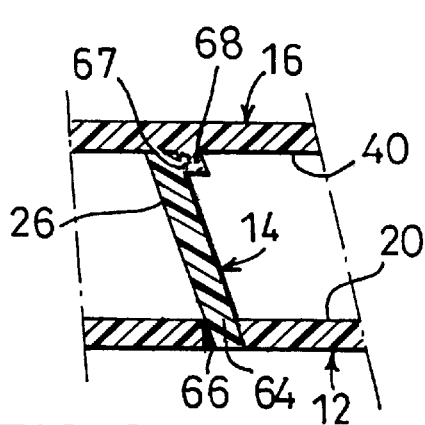
FIG. 8 is a view similar to FIG. 6, showing the third embodiment of the bladed wheel in which the blades are provided with axial projections in accordance with FIG. 7.

As can be seen in FIG. 8, in a fourth embodiment, the slots 66 formed in the concave rear wall of the front shell 12 may be in the form of through slots, so as to receive the axial projections 64 of the blades 26. The axial projections 64 in this example are adhesively bonded in the slots 66. Preferably, such an arrangement only requires each blade 26 to include axial projections 64. For reasons of balancing, it is enough that a certain number of the blades 26, diametrically opposed to each other, have axial projections 64.

In a further version (not shown), the concave edges 61 of the blades 26 may include similar axial projections, and the convex wall 40 of the rear shell 16 may include similar notches.

It can also be seen in FIG. 8 that this fourth embodiment is substantially different from the third embodiment, in that the set of blades 14 can with advantage be secured against rotation with respect to the rear shell 16 by means of interposed rear abutment lugs 68, which project axially forward from the convex front wall 40 of the rear shell 16, and against which the side faces 67 of the blades 26 bear so that they can be, and advantageously are, bonded adhesively thereto.

Figure 9:
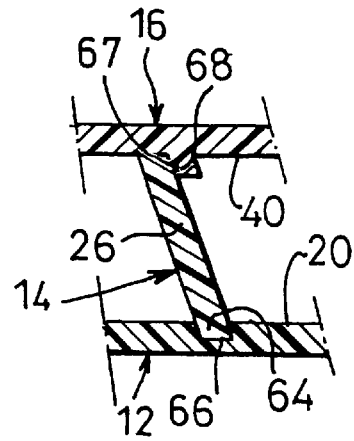
FIG. 9 is a view similar to FIG. 8, showing a fourth embodiment of the bladed wheel, which includes blades which have axial projections but which are adhesively bonded on the abutment lugs of the rear shell, by way of modification to the embodiments described with reference to FIG. 8.

This arrangement is repeated in the view in FIG. 9, which shows a fifth embodiment in which the slots 66 for receiving the axial projections 64 are not through slots. In this fifth embodiment, the convex wall 18 of the front shell 12 is not perforated, and it consequently has improved resistance to the forces involved, while having a convex front wall 18 which is smoother and which reduces turbulence within the converter.

Figure 10:
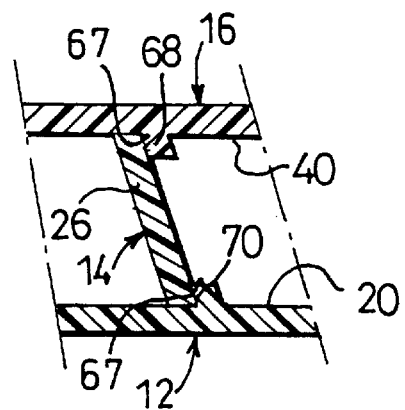
FIGS. 10 and 10a are views similar to FIG. 9, showing a fifth embodiment of the bladed wheel, which includes blades which do not have axial projections and which are adhesively bonded on the abutment lugs of the front and rear shells, by way of modification to the embodiments described with reference to FIG. 8.
Figure 10A:
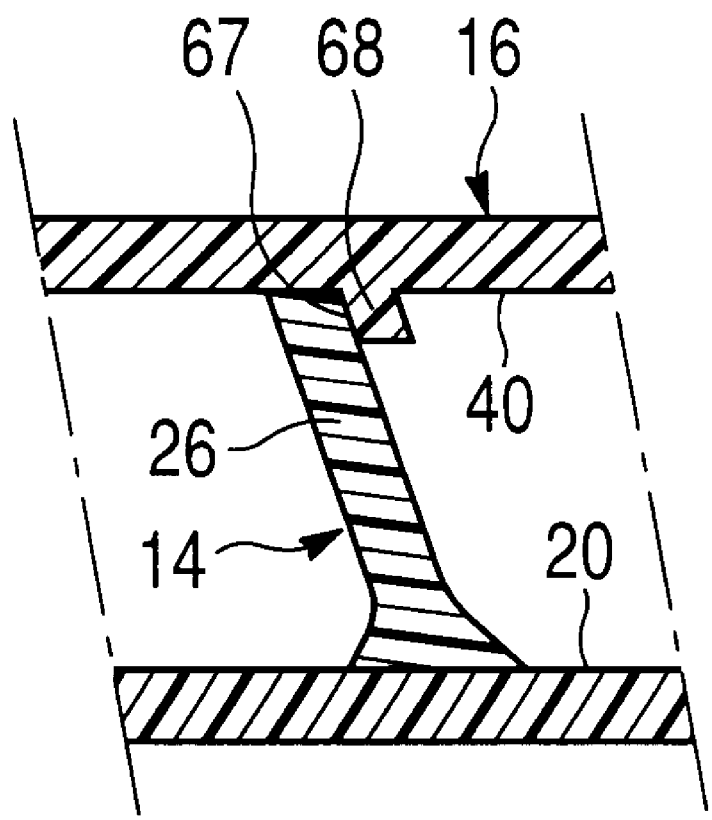

Finally, the view in FIG. 10 shows a system for the adhesive bonding of the set of blades 14 between the front shell 12 and the rear shell 16, in which the principle of the rear abutment lugs 68 carried by the rear shell 16 is maintained and extended to the front shell 12. Accordingly, the front shell 12 has, on its concave rear wall 20, front abutment lugs 70 which extend axially rearwards so as to receive the side faces 67 of the blades 26 of the blade set 14 by adhesive bonding.

An advantage of this arrangement is that it provides a remedy for the centering problems that can arise when there is a plurality of contact points, the dispersions which are related to the process of molding the set of blades 14 being absorbed by depositing an adequate quantity of adhesive during the assembly operation, firstly between the blades 26 and the abutment lugs 68 of the rear shell 16, and secondly between the blades 26 and the abutment lugs 70 of the front shell 12.

These various embodiments have the advantage that they simplify the manufacture of a bladed converter wheel 10, which construction substantially reduces the number of complex forms to be obtained by a molding process. Such an assembly of simple molded forms then has a favorable effect on production costs.

As will have been understood, the blade set 14 is easy to strip axially from the mould through the plane of mould separation, with the small ring portion 28 and the large ring portion 30 facilitating the axial stripping operation while giving an assembly which can be fitted within the front shell.

Assembly of the three elements 12, 14, 16 is obtained by adhesive bonding or friction welding in the case of thermoplastic material. In another version, the blade set or sets can include overmolded steel elements so as to give a more solid assembly, for example by welding with the shells 12, 16, which are then of metal.

What is claimed is:

1. A bladed wheel (10) for a hydraulic transmission apparatus for a motor vehicle, having the general form of a half torus, and comprising, arranged axially and successively in this order, an endless front shell (12) which has the general form of a half torus of large outer diameter, and an endless rear shell (16) coaxial with the front shell (12) and having the general form of a half torus of small outer diameter, between which there is arranged a set of blades (14), the blades (26) of which extend radially, circumferentially and axially between a concave wall (20) of the front shell (12) and a convex wall (40) of the rear shell (16) in facing relationship therewith, wherein the rear shell (16), the set of blades (14), and the front shell (12), are formed separately and are then assembled together so as to constitute the bladed wheel (10), the blades (26) of the bladed wheel (10) being joined at least partly together and being made by molding, and wherein the set of blades (14) is bounded axially by a rear envelope surface (34) which is partly complementary to the convex wall (40) of the rear shell (16), and by a front envelope surface (32) which is complementary with the concave wall (20) of the front shell (12); and the blades (26) are joined together by means of a small annular ring portion (28) which is in cooperation with an annular inner centering edge (22) of the front shell (12), and a large annular ring portion (30) which is in cooperation with an annular external centering edge (24) of the front shell (12).

2. A bladed wheel (10) according to claim 1, characterised in that the rear shell (16), the set of blades (14), and the front shell (12) are assembled together by adhesive bonding.

3. A bladed wheel (10) according to claim 1, characterised in that the set of blades (14) and the front shell are assembled together by friction welding.

4. A bladed wheel (10) according to claim 1, wherein the set of blades (14) includes overmolded steel elements for fastening the set of blades (14) by welding to the front shell (12).

5. A bladed wheel (10) according to claim 2, characterised in that the annular outer edge (24) of the front shell (12) is adhesively bonded on the large annular ring portion (30) connecting the blades (26) together, and in that the annular inner edge (22) of the front shell (12) is adhesively bonded on the small annular ring portion (28) connecting the blades (26) together.

6. A bladed wheel according to claim 5, characterised in that the convex wall (40) of the rear shell (16) is bonded adhesively on notches (38) in concave rear edges (59) of the blades (26), and in that the concave wall (20) of the front shell is adhesively bonded on convex front edges (61) of the blades (26).

7. A bladed wheel (10) according to claim 5, characterised in that the convex wall (40) of the rear shell (16) includes rear abutment and adhesive bonding lugs (68) which extend axially forward along the side faces (67) of blades (26) in the blade set (14), and on which the blades (26) are bonded adhesively.

8. A bladed wheel (10) according to claim 6, characterised in that the concave wall (20) of the front shell (12) includes front abutment and adhesive bonding lugs (70) which extend axially rearward along side faces (67) of blades (26), and on which the blades (26) are adhesively bonded.

9. A bladed wheel (10) according to claim 5, characterised in that the concave wall (20) of the front shell (12) includes slots (66) adapted to receive axial projections (64) which extend axially forward from convex edges (61) of the blades (26).

10. A bladed wheel according to claim 5, wherein the convex wall (40) of the rear shell (16) includes slots adapted to receive axial projections which extend axially rearwards from concave edges (59) of the blades (26).

11. A bladed wheel (1) according to claim 1, wherein each of the small annular ring portion (28) and large annular ring portion (30) includes on its periphery notches (50, 52) which are adapted to receive spigots that extend axially rearwards, respectively from the annular inner centering edge (22) of the front shell (12) and from the annular outer centering edge (24) of the front shell (12).

12. A bladed wheel (10) according to claim 1, characterised in that the set of blades (14) consists of a plurality of angular portions.

13. A bladed wheel (10) according to claim 1, characterised in that the set of blades (14) is cast in aluminium alloy.

14. A bladed wheel (10) according to claim 1, wherein the set of blades (14) is molded in a thermosetting plastics material reinforced with fibers of one of glass, carbon and Kevlar.

15. A bladed wheel (10) according to claim 1, wherein the set of blades (14) is molded in a thermoplastic material reinforced with fibers of one of glass, carbon and Kevlar.

* * * * *